(12) United States Patent
Fischer et al.

(10) Patent No.: US 7,726,237 B2
(45) Date of Patent: Jun. 1, 2010

(54) PRINTING APPARATUS FOR MAKING COLORED CONTACT LENSES

(75) Inventors: Alfred Fischer, Niedernberg (DE); Norbert Dörr, Griesheim (DE); Stefan Wolz, Grosswallstadt (DE); Peter Brotzmann, Obernburg (DE); Stefan Schmittner, Bessenbach (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/377,595

(22) Filed: Mar. 16, 2006

(65) Prior Publication Data

US 2006/0207446 A1    Sep. 21, 2006

(30) Foreign Application Priority Data

Mar. 18, 2005    (EP)    ................... 05005980

(51) Int. Cl.
*B41F 17/00*    (2006.01)
(52) U.S. Cl. ..................... 101/41; 101/44; 101/424.1
(58) Field of Classification Search .................. 101/35, 101/41, 42, 43, 44, 150, 163, 167, 169, 170, 101/193, 424.1, 425, 488
See application file for complete search history.

(56) References Cited

U.S. PATENT DOCUMENTS

| 5,637,265 | A | 6/1997 | Misciagno et al. ........... 264/1.7 |
| 6,393,981 | B1 | 5/2002 | Cameron ..................... 101/163 |
| 7,255,438 | B2 | 8/2007 | Atkins | |
| 2006/0065138 | A1 | 3/2006 | Tucker | |

FOREIGN PATENT DOCUMENTS

| DE | 1 916 629 | 4/1969 |
| EP | 0 262 832 B1 | 9/1987 |
| EP | 0 357 062 B1 | 8/1989 |
| EP | 0 641 806 B1 | 1/1996 |
| EP | 0 941 829 B1 | 12/2002 |
| WO | WO 98/42497 | 10/1998 |

OTHER PUBLICATIONS

International Search Report w/Opinion.

*Primary Examiner*—Ren Yan
(74) *Attorney, Agent, or Firm*—Robert Ambrose

(57) ABSTRACT

A printing station for producing a layer of coloring for a contact lens, comprising a transport system to carry and transport a molding tool which comprises at least one contact lens forming mold, a pad unit comprising at least one pad, and a blade unit suitable to carry and ink a cliché with an ink. When in use the pad transfers an inked image from the cliché to the contact lens forming mold. The printing station further at least partially cures the inked image after it has been transferred to the mold and cleans the pad.

6 Claims, 13 Drawing Sheets

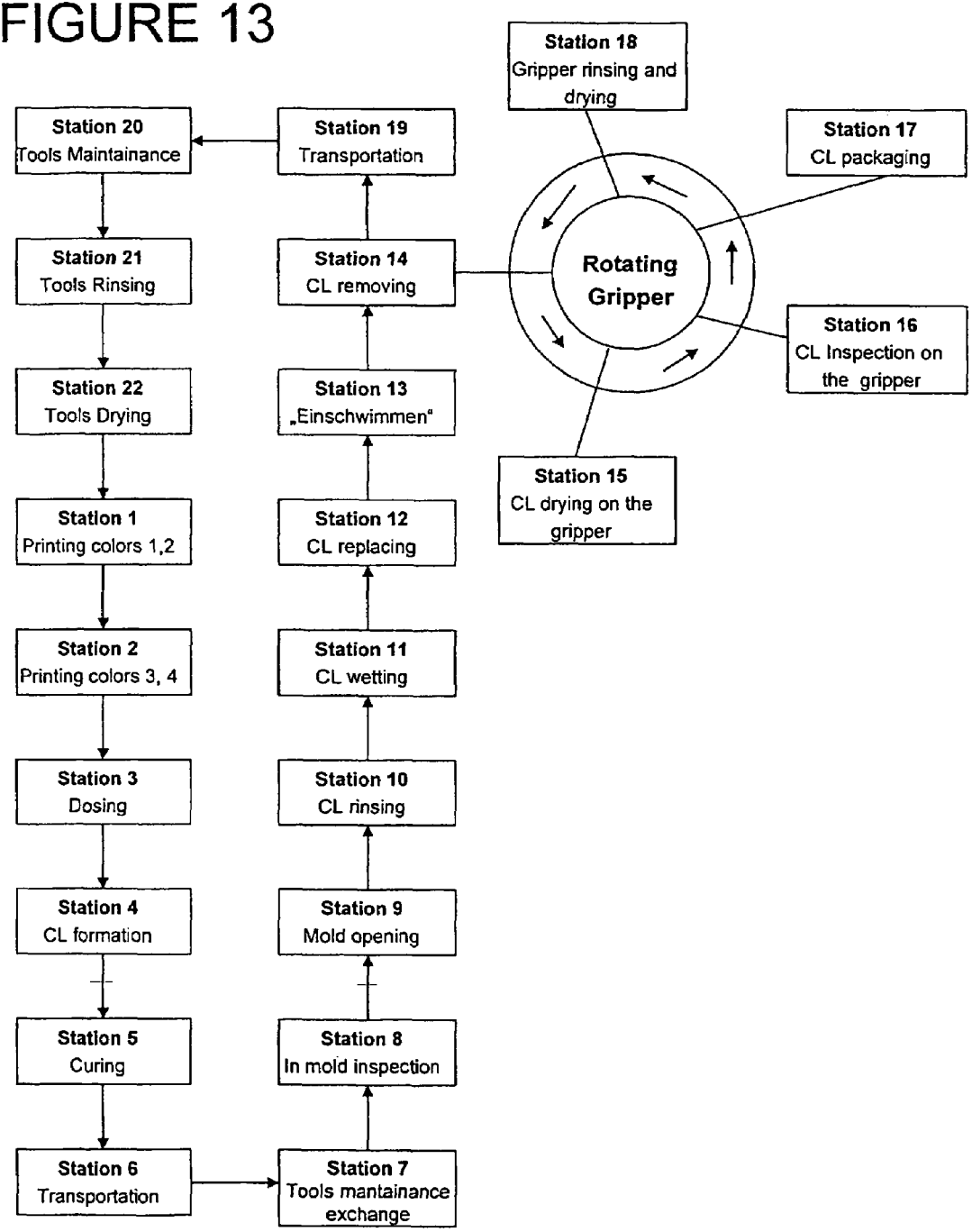

PRINTING APPARATUS FOR MAKING COLORED CONTACT LENSES

This application claims benefit under 35 USC §119 of European patent application No. EP 05005980.7 filed Mar. 18, 2005, the contents of which are incorporated herein by reference.

The present invention generally relates to a printing station for making colored contact lenses. More specifically, the present invention relates to a pad transfer printing station for making colored hydrogel contact lenses with good image quality in an on-line contact lens manufacturing plant.

Contact lenses having one or more colorants dispersed in the lens or printed on the lens are in high demand. These colored contact lenses may enhance the natural beauty of the eye, or provide unique patterns on the iris of the wearer, or provide non-cosmetic patterns or marks, such as rotation marks, inversion marks, product/brand codes, lot numbers, "DEMO" lenses, and the like, which are of benefits to wearers, eye-care practitioners and manufacturers.

A known method of printing inks onto contact lenses involves ink transfer printing or pad printing, which method is generally disclosed in U.S. Pat. No. 5,637,265.

According to this method, a pattern in the form of a colored film is transferred to the contact lens. The pattern of the liquid colored film can be provided by etching or lasering a metal or ceramic plate also called cliché. The etched pattern is then filled with an appropriate ink, leveled out with a suitable doctoring device, and a soft silicone rubber transfer stamp or pad impressed thereupon to transfer the pattern on the pad's surface. The pad containing the image is then brought to the contact lens and depressed in the correct place to transfer the pattern thus creating the colored contact lens.

A suitable machine for applying this method is disclosed in U.S. Pat. No. 6,393,981.

Due to the increased demand of colored contact lenses it is desirable to be able to produce large amount of lenses according to the method above in a time and cost efficient way. Therefore there is the need to develop an automatic pad printing station which allows the printing of several lenses at the same time and may be integrated in an on line contact lens production plant.

The invention provides a pad transfer-printing station for producing a colored contact lens, comprising:

(a) a transport system to carry and transport a molding tool which comprises at least one contact lens forming mold;

(b) a pad unit comprising at least one pad;

(c) a blade unit suitable to carry and ink a cliché with an ink; wherein when in use the pad transfers an inked image from the cliché to the contact lens forming mold;

(d) curing means to cure at least partially the inked image after it has been transferred to the mold; and (e) cleaning means to clean the pad after use.

Preferably the colored lens produced according to the present invention is a hydrogel colored lens.

Preferably the printing station is integrated in an automatic contact lens production line. Thereby after printing the molds within the printing station of the present invention the molding tool is transported out of the printing station into a dispensing station where the contact lens forming material is fed into the molds. Subsequently the molds are closed and a contact lens is formed by curing the lens forming material within the molds. Optionally one or more inspection stations are in place in the production line to inspect the quality of the print and the defects of the lens itself.

Preferably the printing station is used in combination with water based inks which allow simplifying the automated production of colored contact lenses, resulting in more environmentally friendly and inexpensive products. Even more preferably the water based ink comprises a water-soluble prepolymer comprising ethylenically unsaturated groups.

In an advantageous embodiment the printing station further includes humidifying means to humidify the air in the printing station and/or in the immediate vicinity of the pads and further includes a relative air humidity control system. Within the printing station the relative air humidity is in general kept higher than 50%, preferably between 60 and 90% at normal pressure and temperature conditions.

With the printing station of the present invention, preferably more than 1 mold are printed at the same time, for example from 2 to 30, preferably from 6 to 24 and even more preferably from 8 to 14.

Preferably from 2 to 30 colored lenses, more preferably from 6 to 24 and even more preferably from 8 to 14 colored lenses are manufactured in less than five minutes, preferably in less than three minutes and even more preferably in less than two minutes.

BRIEF DESCRIPTION OF THE DRAWING

FIG. 13 shows a schematize production line according to a preferred embodiment.

The invention relates to a pad transfer printing station for the manufacture of a molded colored contact lens containing a transparent central visual session and a colored image on at least a part of the remaining surface. A color image may be a cosmetic pattern, for example, iris-like patterns, fashion patterns (e.g. Wild Eye™), made-to-order (MTO) patterns, prosthetic patterns and the like; an inversion mark that allows a user to handle and insert easily a contact lens; a toric rotation mark, or contact lenses stock keeping units (SKUs), for example, either in forms of numbers or as bar codes. A color image may be a single color image or a multi-color image.

Figure 1:
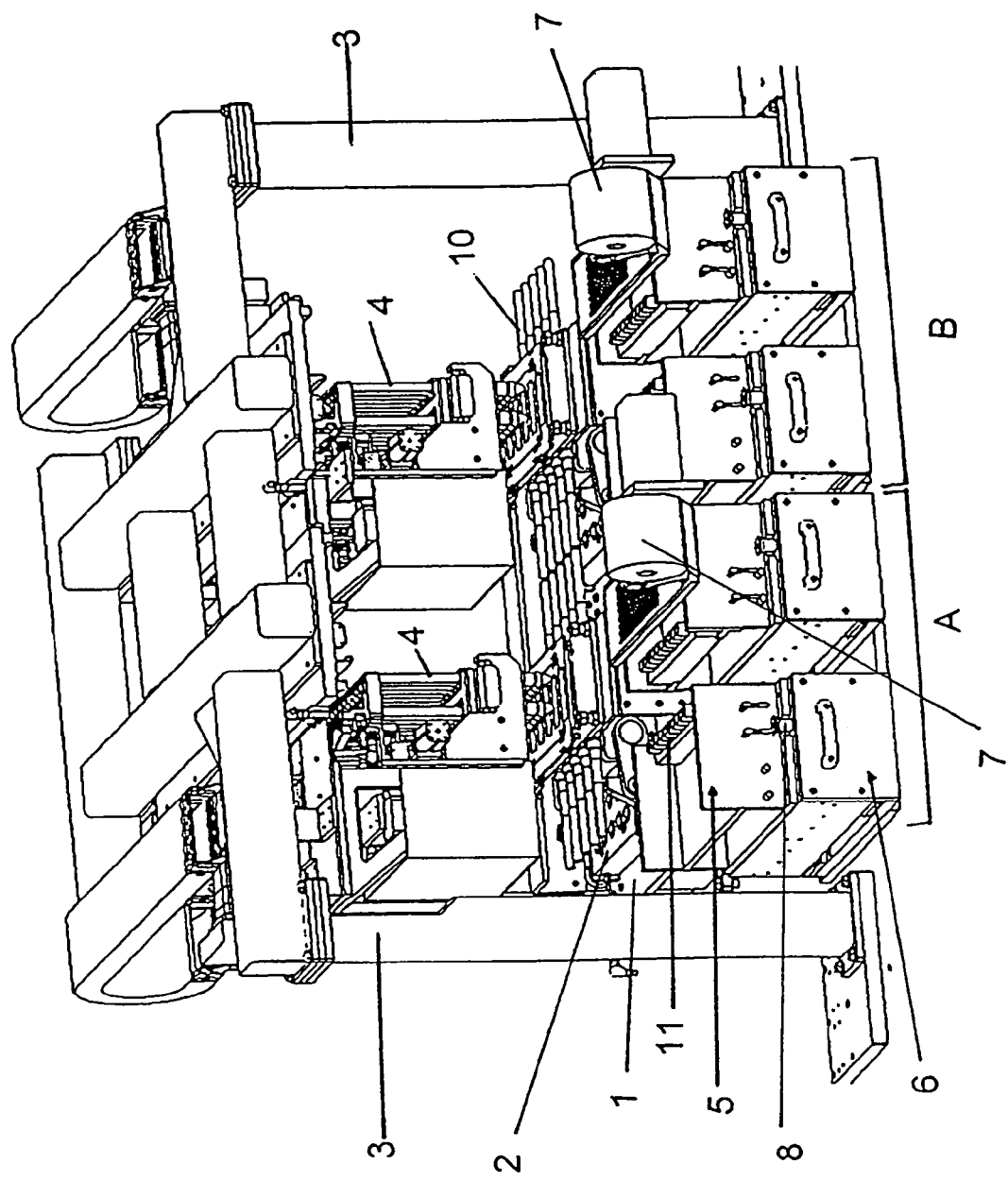
FIG. 1 shows a printing station according to one embodiment of the present invention.

FIG. 1 shows a pad transfer printing station according to one embodiment of the present invention. The station comprises a transport subsystem (1) wherein a contact lens molding tool (2) is carried and transported in the station for printing and after moved out of the station.

The molding tool (2) comprises at least one contact lens forming mold. For cast molding, a mold generally comprises at least two mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Lens forming molds may be made by all materials known in the art for making molds. Example are polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or quartz, glasses or sapphire. The molds may be disposable (e.g., single-use) or reusable molds. Reusable molds following the production of a lens, may be cleaned rapidly and effectively from the uncrosslinked prepolymer and other residues, using water or a suitable solvent, and can be dried with air.

In principle a molding tool may simply consist of a pair of first and second mold halves. The mold halves may be conveniently inserted in a supporting plate. However known molding tools for the manufacture of contact lenses consist of two support plates in which several pairs of opposed mold half inserts are arranged. The inserts of the two mold halves are in alignment with one another and when the mold is closed they form a mould cavity between them. The support plates may hold several tool inserts, which form several mould cavities for simultaneous manufacture of several contact lenses. Preferably the molding tool described in EP-B-0941829 is used.

The transport subsystem (1) moves the molding tool (2) along a predetermined path into the printing station wherein one mold at the time or preferably several molds at the same time are printed thereupon. The printing process comprises transferring ink of one or more colors from a cliché to the first and/or second molding surface of the mold/s and optionally pre-curing the ink after each color deposition. The molding tool (2) is conveniently in a stationary position during at least one step of the printing process. Preferably the molding tool is in a stationary position for no longer than 30 seconds; more preferably for no longer than 10 seconds and most preferably for no longer than 5 seconds. Computer controlled stopping bars and indexing means are preferably used to stop and position the molding tool within the printing station.

Preferably the mold halves in the molding tool have the optical surfaces exposed, ready for printing when they enter the printing station.

The printing station shown in FIG. 1 consists of a portal like rack (3) and side stations A and B. According to a preferred embodiment an inner and an outer pattern are printed on the mold's surface in side station A, while an iris-like pattern is printed on the mold's surface in station B.

The number of side stations is however completely arbitrary and in alternative the printing station may consists of only one side station or more than two side stations. Each side station may be dedicated to printing only one color and/or pattern on one molding surface or may be used to print several colors and/or patterns.

Figure 10:
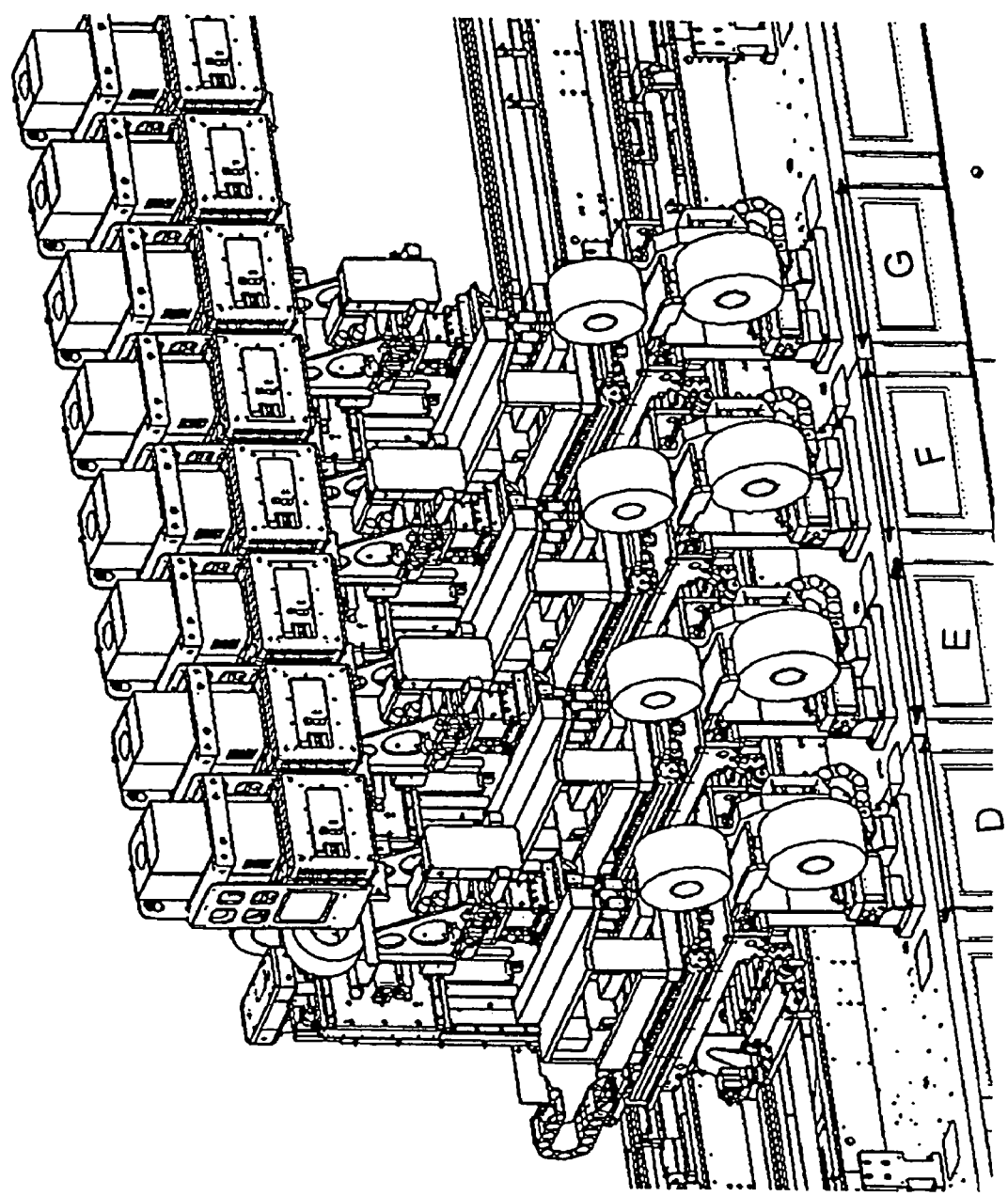
FIG. 10 shows a printing station according to another embodiment of the present invention.

A printing station according to a preferred embodiment features 4 side stations (C, D, E, F) each station dedicated to printing on the same mold surface/s respectively an inner pattern, an outer pattern, an iris-like pattern and an inversion mark as shown in FIG. 10.

Each side station preferably comprises a pad unit (4), at least one blade unit (5), at least one cliché (9) and a color fetching unit (7). The blade unit may be positioned on sliding means or drawers (6) and preferably secured to it by means of a pin (8).

In the preferred embodiment of FIG. 1 each side station comprises two blade units (5) and two clichés (9) while in the preferred embodiment of FIG. 10 each side station comprises only one blade unit (5) and one cliché (9).

Preferably the pad unit is a 3 axes controlled pad unit (4) and it is fastened to the portal rack (3) and its movement along the 3 axes is completely free programmable. Even more preferably the pad unit (4) may be completely taken out of the station for revision.

A pad unit (4) consists of at least of one pad preferably of several pads. In the preferred embodiments of FIGS. 1 and 10 the pad unit (4) consists of 20 pads. The pads in the pad unit may be all dedicating to the printing of one color or divided between several colors or patterns.

Each blade unit (5) comprises an ink supply, which in a preferred embodiment is an ink cup (11) or a series of ink cups and a doctoring blade (not shown). A cliché (9) is conveniently positioned within the blade unit (5).

According to the preferred embodiment of FIG. 1, the cliché (9) can automatically move between two different positions, the inking position and the ink transferring position.

Figure 2:
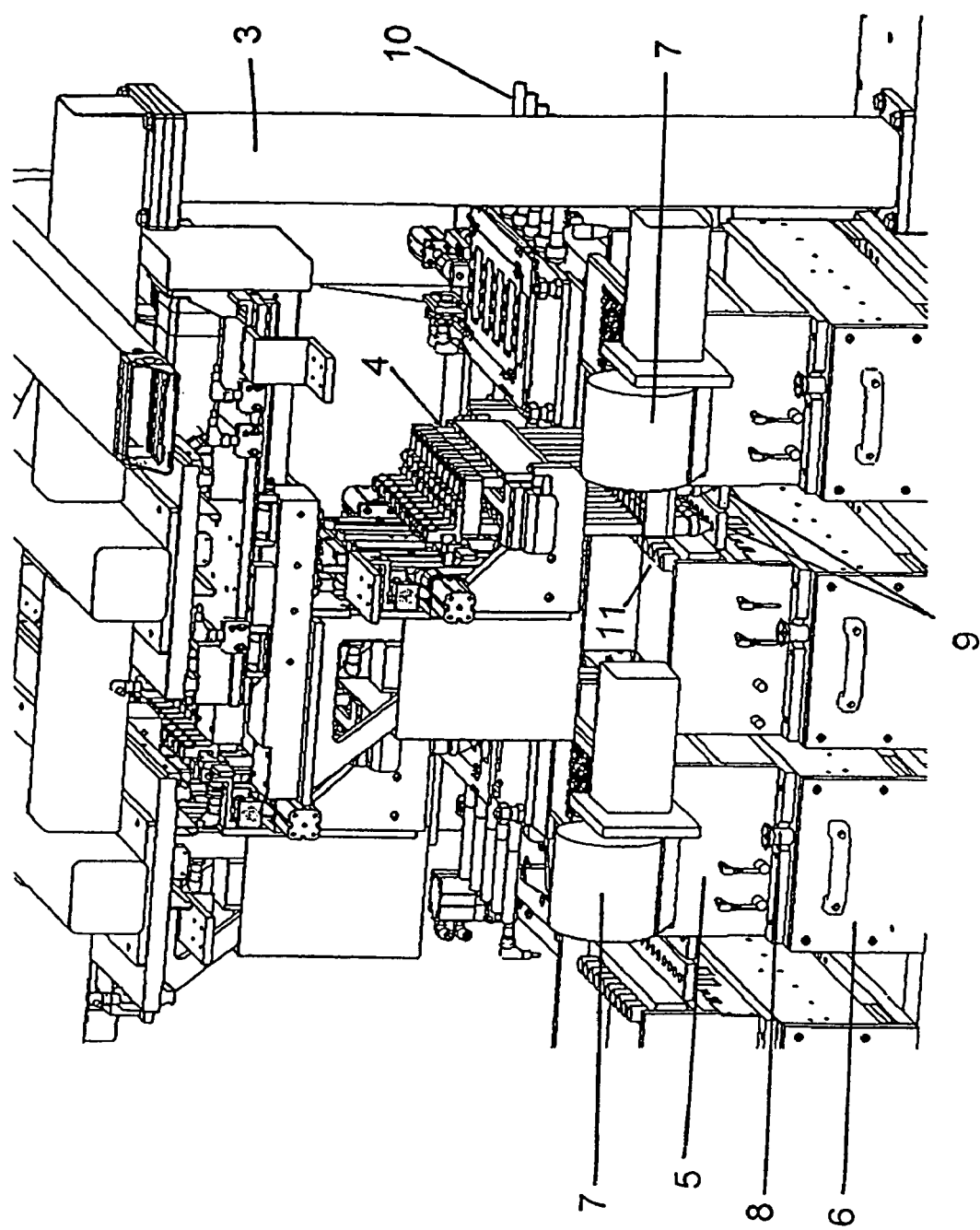
FIG. 2 shows a pad unit picking the ink from the cliché, front view, according to the preferred embodiment of FIG. 1.
Figure 3:
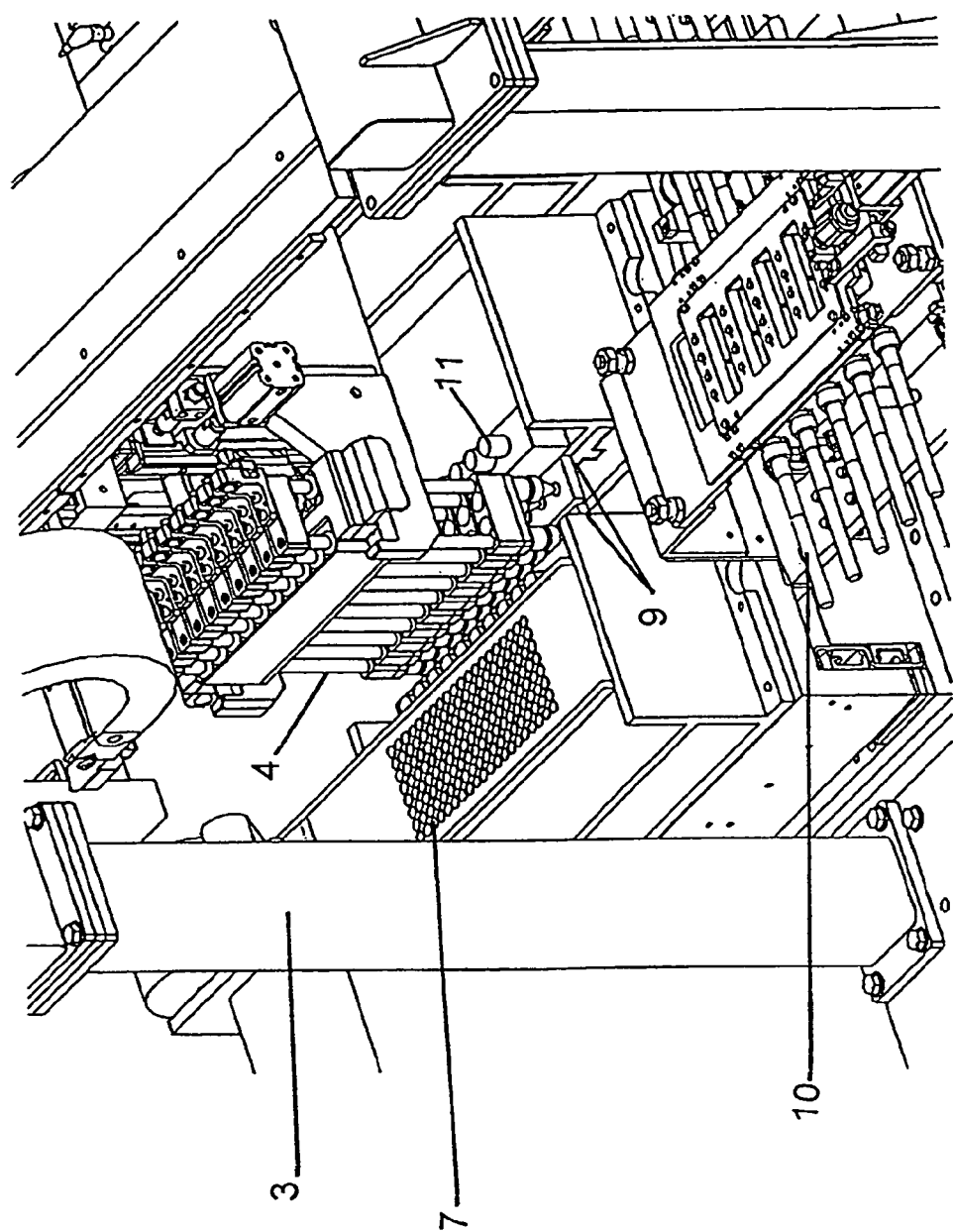
FIG. 3 shows a pad unit picking the ink from the cliché, back view, according to the preferred embodiment of FIG. 1.

In the inking position the cliché is completely inside the blade unit, and therefore not visible from outside. While the cliché (9) is in the inking position the ink cups (11) are first automatically pressed down on the cliché (9) to fill with the ink the image patterns etched on the cliché and then brought back up in the original position. After, the cliché (9) moves to the ink transferring position while the doctoring blade levels the excess ink out. FIGS. 2 and 3 shows the clichés (9) of side station A in the ink transferring position while the pad unit (4) is picking up the inked patterns from it.

In order to position and/or exchange a cliché (9) within the blade unit (5), the pin (8) on the front side must be removed so that the sliding means and the blade unit positioned on top of it may slide out.

In alternative, according to the preferred embodiment of FIG. 10 the cliché (9) remains in a stationary position during the whole process, while the ink cups and the doctoring blade conveniently positioned in a container (17) move over it.

Figure 11:
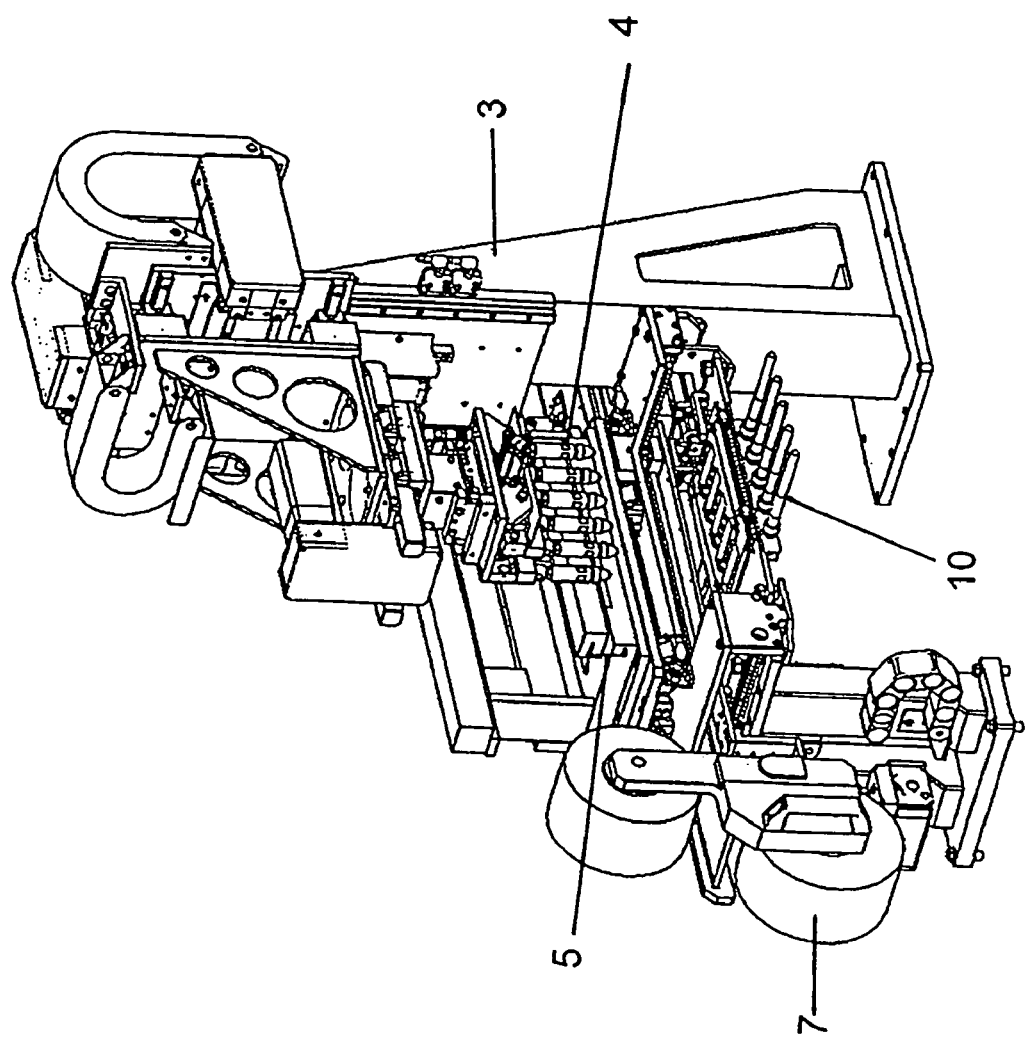
FIG. 11 shows in more detailed a side station according to the preferred embodiment of FIG. 10.
Figure 12:
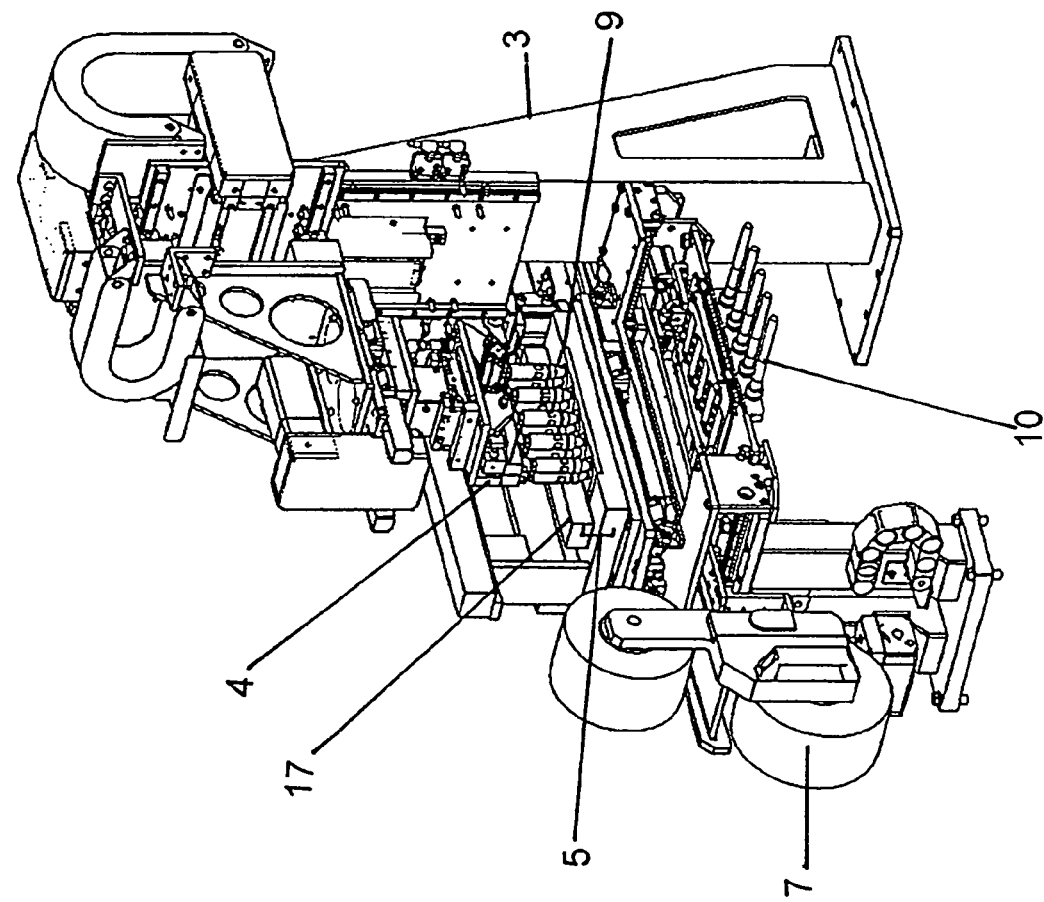
FIG. 12 shows the side station of FIG. 11 while the pads are picking the ink from the cliché.

While the cliché (9) is being inked the ink cups (11) are first automatically pressed down on the cliché (9) to fill with the ink the image patterns etched on the cliché as shown in FIG. 11. After, the container (17) moves away from the cliché while the doctoring blade levels the excess ink out. FIG. 12 shows the clichés (9) of one of the side station of FIG. 10 while the pad unit (4) is picking up the inked patterns from it.

Figure 4:
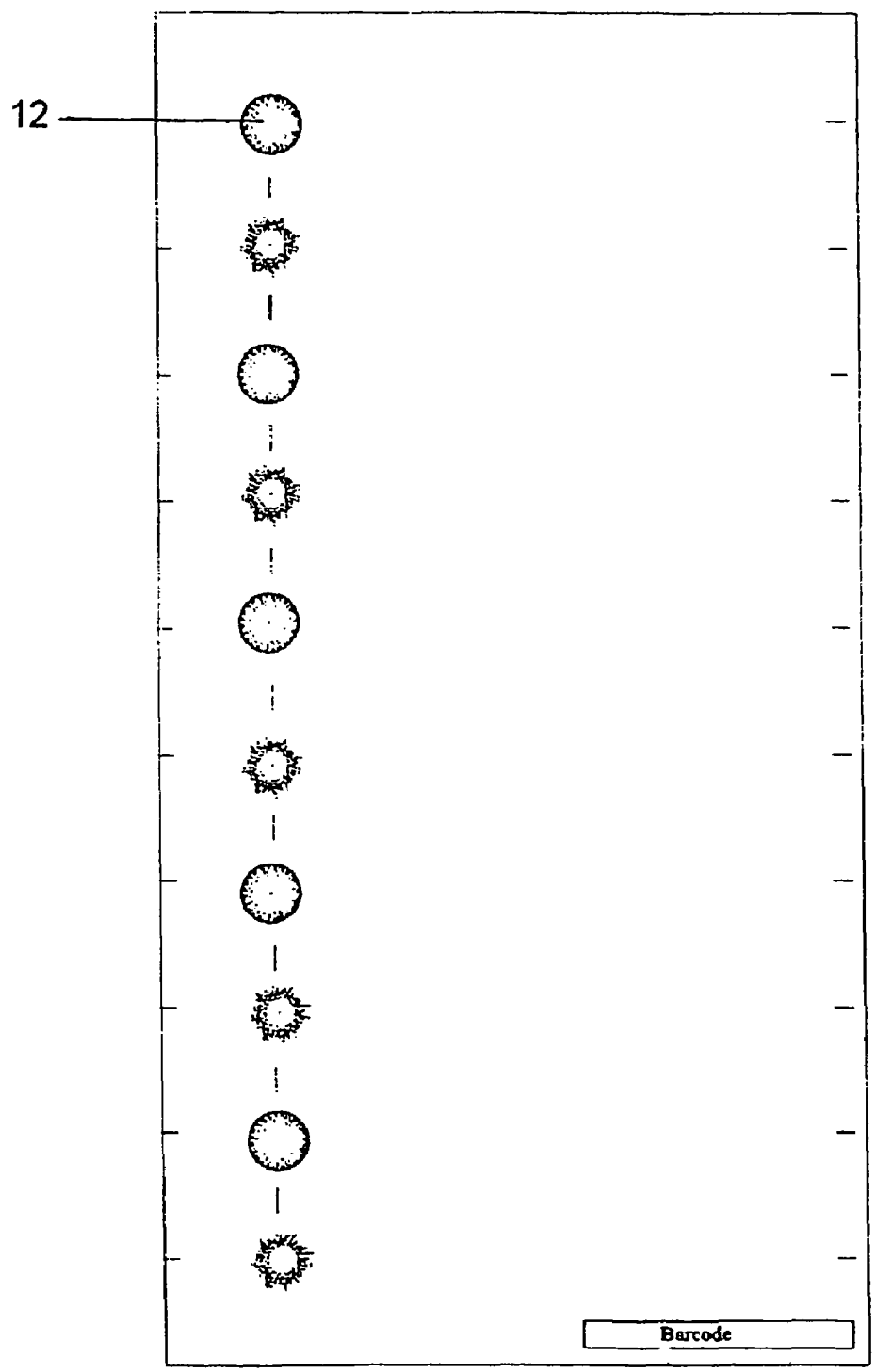
FIG. 4 shows a cliché according to one embodiment of the present invention.
Figure 5:
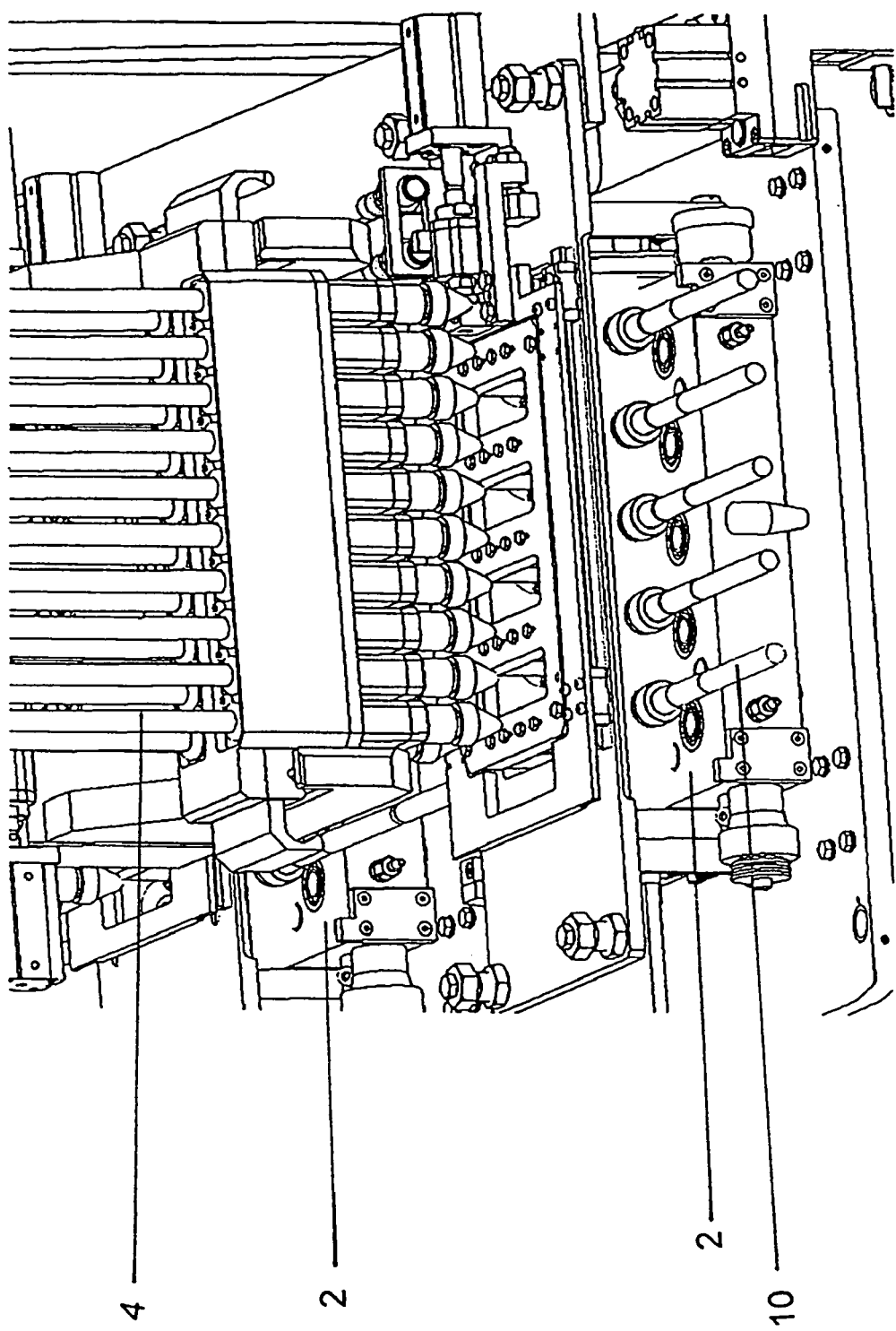
FIG. 5 shows a pad unit positioned on the molding tool.

Clichés (9) used in the present invention may be made of metals (e.g., steel) or preferably of ceramics. Image patterns (12) can be etched into a cliché according to any methods known to a person skilled in the art, for example, by chemical etching or laser ablation or the like. Preferably the cliché of the present invention contains 10 or more than 10 patterns (12) even more preferably contains 20 patterns or 24 patterns (12). Accuracy of the patterns (12) is preferably of the order of few microns (e.g. 2 microns). FIG. 4 shows a cliché (9) wherein 2 different print patterns (12) have been reproduced 5 times each. This cliché is useful to print 10 molds at the same time.

The clichés may be periodically cleaned, such as soaking in an appropriate solvent, sonication, or mechanical abrasion. A cleaning is particularly preferred in case of shallower clichés selected (20 μm depth), where ink buildup might cause a more rapid degradation of the pattern.

In order to transfer the inked pattern from the cliché (9) to a mold surface in the molding tool (2) the pad unit (4) is automatically moved along the X and Y axes over the inked cliché. The pads in the pad unit (4) move down along the Z ax to pick the ink from the cliché (9) as shown in FIGS. 2 and 12 and after they return back up. The X and Y axes drive the pad unit (4) over the molding tool (2) wherein the pads descend and delivers the ink to the mold surface/s.

Figure 6:
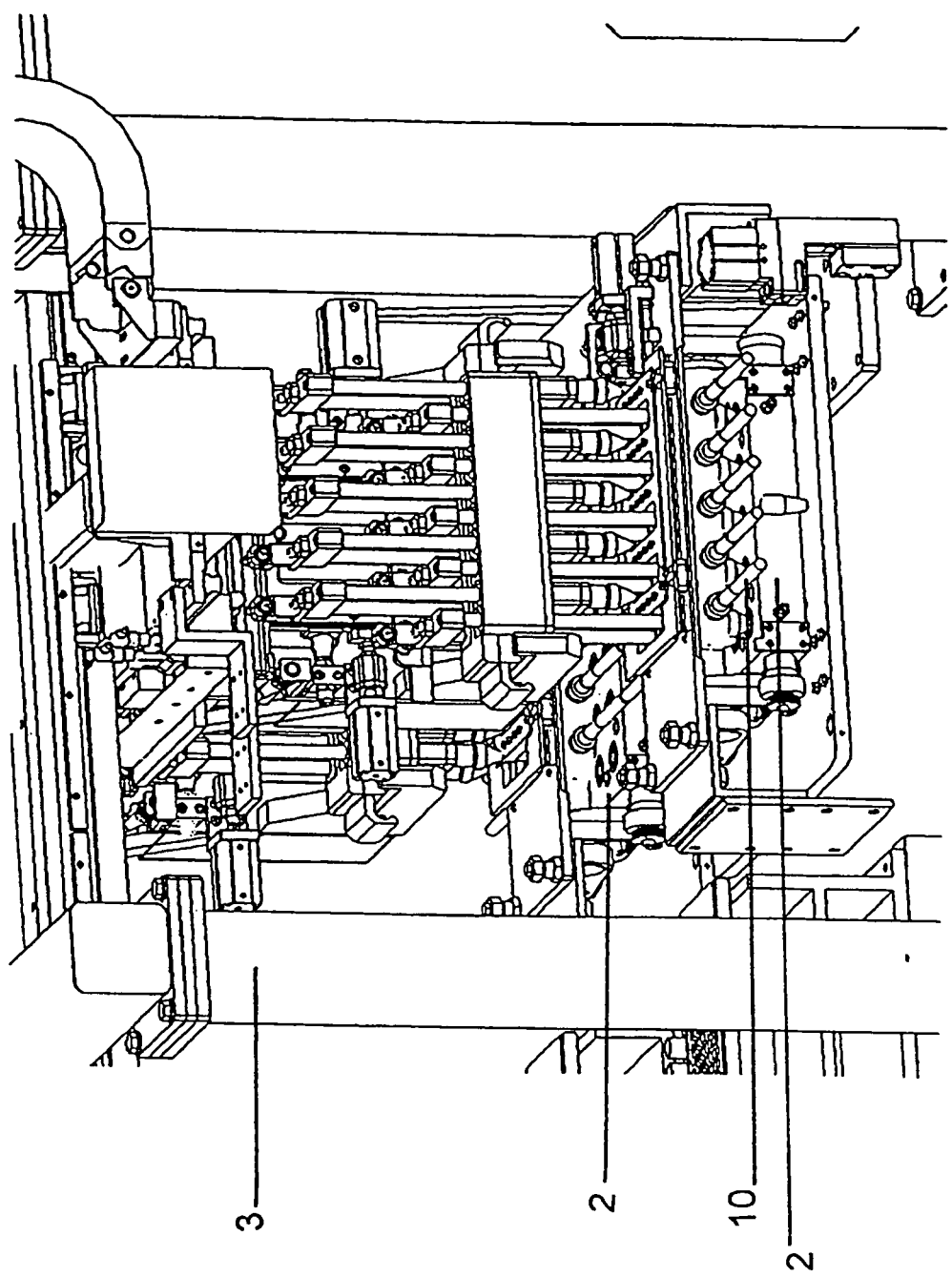
FIG. 6 shows a pad unit while transferring one color or pattern to the contact lens molds.
Figure 7:
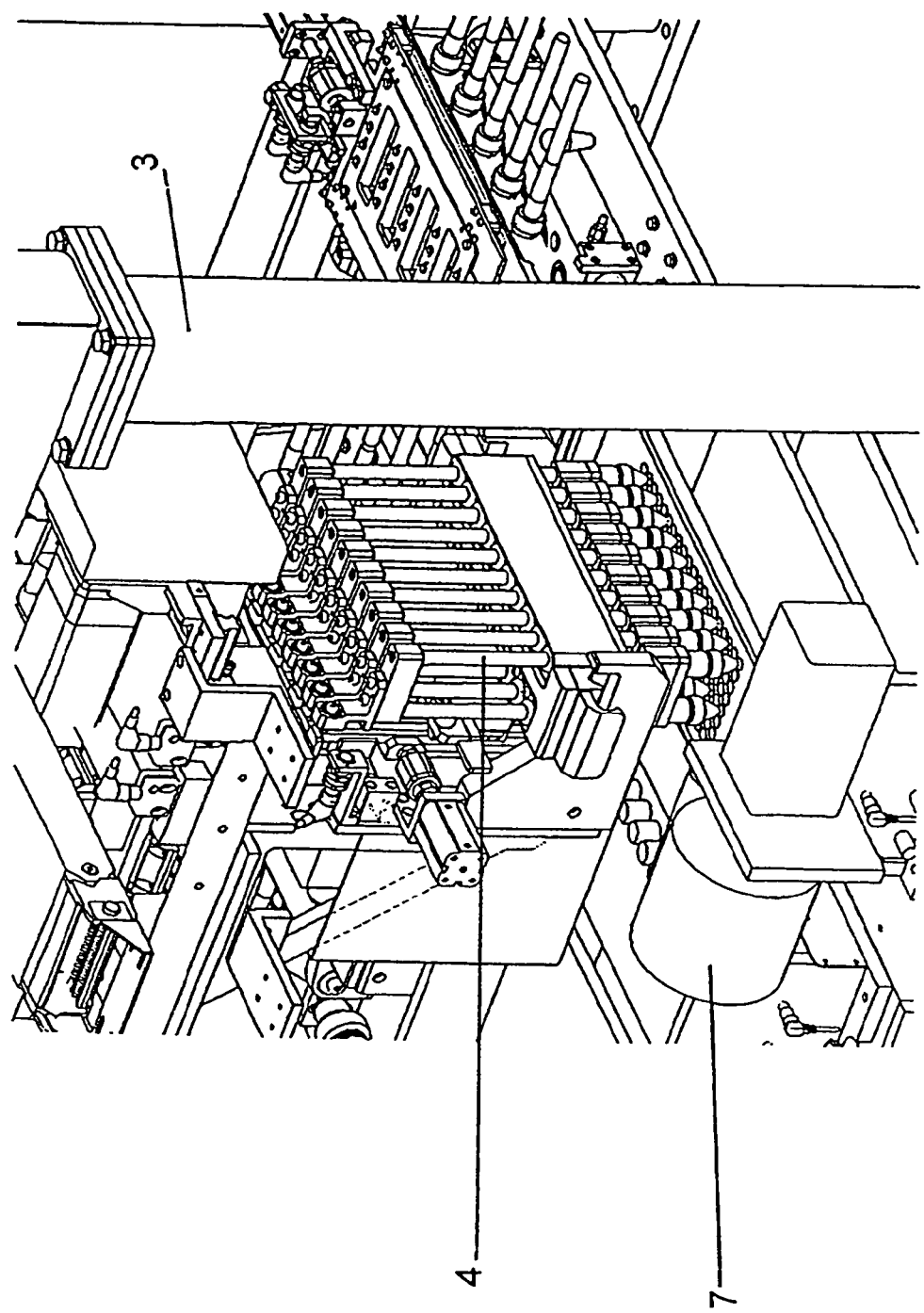
FIG. 7 shows a pad unit touching a color fetching unit, according to the preferred embodiment of FIG. 1.

According to one embodiment of the present invention, shown in FIG. 6, only part of the pads in the pad unit (4) descend to the mold in first place to deposit a first color and/or pattern and only in a second step when the first set of pads has returned to their original position the remaining pads descend and deposit the second color and/or pattern to the molds.

After the upward motion of all the pads after delivering the ink on the molds, a pre-curing unit is preferably activated to at least partially fixing the color for a defined amount of time. In the meantime the cliché (9) has returned back to its original position below the ink cup in the inking position.

During fixing of the printed color/s or pattern/s the pad unit (4) moves over the color fetching unit (7). The pads are than moved all the same time along the z ax to touch the color fetching unit whereupon the ink remaining on the pads is captured and the pads cleaned. The pads are then moved again upwards ready to start a new printing cycle within the side station.

The color fetching unit (7) may be any type of surface able to retain the color left in the pads after printing in the molds. Preferably is a sticky tape like surface that may be easily changed.

Figure 8:
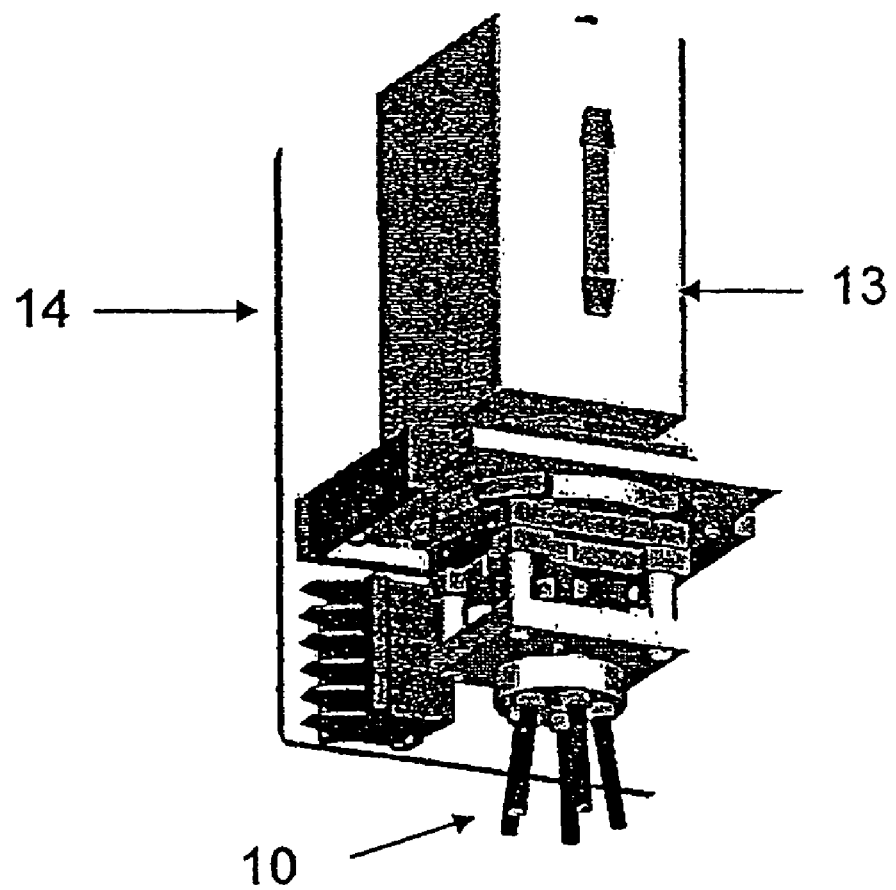
FIG. 8 shows a detail of an illumination system according to a preferred embodiment.

The pre-curing unit generates preferably UV or other actinic radiation such as ionized radiation (e.g. gamma ray or X-ray irradiation), microwave irradiation, and the like, to form a colored film in accordance with the invention. A pre-curing unit may consist of a common lamp (13) or a series of lamps conveniently affixed to the portal rack (3) by means of a plate (14). As shown in FIG. 8 preferably the lamp (13) is connected with one or most preferably with several optical fiber probes (10) in such a way that one lamp provides even illumination for several molds at the same time. Each optical fiber probe (10) provides illumination to al least one mold in at least one molding tool (2). Preferably the lamp (13) is a UV mercury lamp, especially a doped medium pressure mercury lamp, whereby a medium pressure lamp HPA 2020 from Philips or a comparable medium pressure lamp from the company Heraeus may be used for example. In alternative a Hamamatsu lamp may be employed alone or in combination with appropriate cut filters and/or condensers.

The optical fiber probes (10) conveniently have a length from 0.3 to 6 m and are advantageously formed as liquid optical fibers, since these are particularly well suited to the transmission of UV light. As shown in FIGS. 1, and 10 the optical fibers (10) preferably run above the molding tool/s (2) and go across all the side stations. A computer controlled system of mirror and shutter plates ensure that the light is directed to the molding surface when a color or pattern need to be fixed thereupon. Preferably pre-curing times range from 0.1 to 10 seconds preferably from 0.5 to 5 seconds and more preferably from 1 to 2 seconds.

The pad printing structure of the present invention include, but are not limited to Tampo-type printing structures (Tampo vario 90/130), rubber stamps, thimbles, direct printing pads, or transfer print pads as they are known in the art. These print pads preferably comprise silicone or polyurethane. The elasticity of these polymers allows the inks to stick to the pad temporarily and fully release from the pad when it contacts a contact lens mold.

Figure 9:
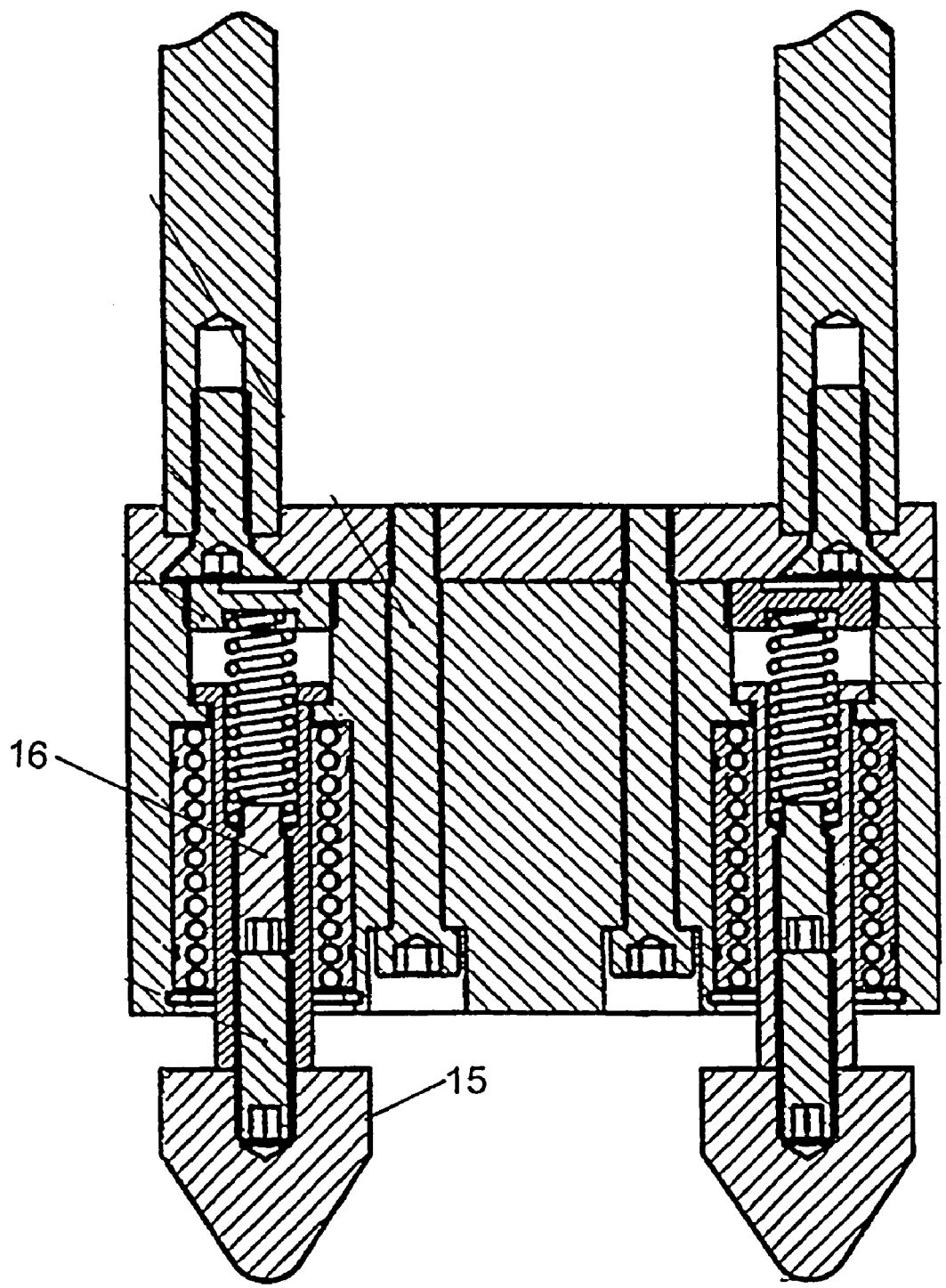
FIG. 9 shows two pad printing structure according to a preferred embodiment.

In order to ensure reproducibility when trying to print several molds at the same time, it is very important that the distance between the each pad head (15) in the pad unit (4) and each mold in the molding tool (2) is equal. This may be achieved by a computer controlled system that make sure that all the pad heads (15) in the pad unit (4) are perfectly aligned or in alternative adjustable pressure hub pads as shown in FIG. 9 may be used. There the spring like structure (16) inside the pads makes sure that the distance between the each pad head (15) in the pad unit (4) and each mold in the molding tool (2) is equal.

To improve the quality of the print the hardness and the shape of the pads maybe optimized according to the radius of the mold to be printed upon and on the position where the pattern will be printed on the mold. Preferably the pads hardness ranges from 1 to 20 shore more preferably between 5 and 15 shore.

According to a preferred embodiment, the pad heads (15) may contain a depression corresponding to the optical visual zone to make sure that no ink is even accidentally printed in the mold in correspondence to the optical visual zone.

After the printing of one or more color in one side station the mold tool moves to the following side station wherein according to the method described above one or more color and or pattern are printed on the mold surface. When the printing on the mold is completed the mold tool moves out of the printing station.

In a preferred embodiment the printing station further comprises means to humidify the air within the printing station. This is particularly preferred when water based inks are used in combination with the present printing station.

Air humidification within the printing station prevents drying of the ink, especially of water soluble ink, on the pads after the ink has been picked up from the cliché and before having been deposited on the molding surfaces ("pick-up to drop off time"), giving rise to an improved image quality According to this embodiment the air humidification and air temperature is carefully controlled within the printing unit. The humid air may be blown on the pad/s every time the pad/s is/are inked. A blanket or a skirt of humid air may be created in the immediate vicinities of the pad/s or directional humidified air may be blown on the pad/s to prevent the drying of the ink. In addition humid air could be blown also on the inked cliché and/or on the inked mold surface.

In alternative a constant relative humidity and temperature may be kept in the printing unit by means of an automated laminar air flow wherein temperature and relative air humidity are constantly or periodically measured and adjusted to the proper value. A typical laminar air flow is between 0.01 to 1 m/sec, preferably the air flow is between 0.1 and 0.5 m/sec. However the air flow may be adjusted and optimized according to the apparatus used. When air humidification is employed, the printing unit is advantageously isolated from the external environment. Within the printing unit wherein however the molding tool may enter and exit in an automatic manner, the relative air humidity and temperature is constantly controlled and adjusted accordingly.

The relative air humidity should be in any case high enough to prevent the drying of the ink but it may not interfere with the contact lens formation. Preferably the relative humidity of the air is between 50 and 100%, more preferably is between 60% and 90% and even more preferably is between 75 and 80% at standard pressure and temperature wherein by standard temperature is meant a range from 15 to 30 degrees Celsius, preferably from 23 to 28 degrees Celsius.

The humidified air can be created either by using humidifying means such as a laboratory bubbler, or any industrial humidifier designed to connect to a duct or directly into the air surrounding the printer.

The air humidification control while printing allows a prolonged "pick-up to drop off time" of the ink on the pad/s and give rise to improved image quality on the final contact lens.

Preferred ink "pick-up to drop off time" ranges between 0.5 to 10 seconds, more preferably between 2 and 5 seconds.

Most preferably the colored image generated according to the present invention on the contact lens shall pass a sterilization-surviving test and at least a finger rubbing test to prove the ink adherence and to give a first indication of the mechanical stability of the lenses. The finger rubbing test is performed by removing the hydrated contact lens from a packaging solution, e.g., buffered saline, and digitally rubbing the lens between either two fingers or a finger and a palm for up to 10 seconds. Visible and microscopic (~10×) observation of colorant bleeding, smearing, or delamination indicates failure of the rub test. Failure of the rub test gives also a first indication of poor mechanical properties of the lens.

"Passing a sterilization-surviving test" means that no significant decoloring or delamination or the like can be observed after a sterilization step such as autoclave, or irradiation with UV light, x-ray, or the like.

Preferably the lens shall also pass an adhesion test, which consist of rubbing the lens with cotton and determining the amount of color which sticks to it.

Surprisingly it has been observed that not only the adherence of the ink to lens is dependent on the air humidity. In fact, the mechanical properties of the lenses, especially the lens formed by a water-based monomer are dependent on the relative air humidity during printing and to the pre-curing and curing times and dosages. In particular higher relative air humidity gives rise to mechanically more stable lenses.

According to a preferred embodiment the printing station is integrated in a partially or fully automated colored contact lens production line, for instance the one described in WO-A-98/42497.

An example of an automated contact lens production line comprising the printing unit of the present invention is also shown schematically in FIG. 13. There it shows that after printing the molds in the molding tool (2) the transport subsystem (1) moves the molding tool (2) out of the printing station (side station 1 and side station 2) into the dispensing station (station 3) wherein the hydrogel lens-forming material is dispensed into a lens forming cavity of the printed mold preferably by using an automatic dispenser.

The printed mold surface or mold half is allowed to sit for 10 seconds, preferably 5 seconds before mating then with corresponding other mold half and closing molds by using a electrical servo axis closing system (station 4). Therein the lens forming material is actinically or thermally cured (station 5) whereby the colored film detaches from the molding surface and becomes integral with the body of the contact lens.

Optionally the contact lens may be inspected for defects in the print and/or in the lens itself while still in the mold (station 8). Then after curing the molding tool moves into the inspection position. Any suitable inspection system known in the art may be used for this purpose. In a preferred embodiment a bright field system employing LEDs as light sources and CCD cameras is used. Conveniently the number of LEDs is equal to the numbers of molds while the number of CCD cameras corresponds to the numbers of molds rows which are two in the preferred embodiment. While the molding tool is stationary in the inspection position the cameras move along the molds rows and record an image which is than elaborated with known algorithms by a computer. Defected lenses will be rejected before packaging.

The formed contact lens is then rinsed, dried (station 10 and 11) and captured by a suitable gripper. Another inspection for defects and tears may be carried on while the lens is on the gripper (station 16). Any suitable inspection system may be used, e.g. a bright-field based system or a dark-field based system or a system which combines bright-field and dark-field. The gripper then deposits the acceptable lens in the packaging container for packaging (station 17) and rejects the rest. In the mean time the molding-tools are automatically transported in their first position after maintenance, rinsing and drying, (stations 20 to 22) ready to be print upon.

In alternative the lenses may be inspected using the same inspection system as above for defects after having been deposited in a suitable container filled with liquid (e.g. water) as described in WO-A-03/016855 or the lenses may be deposited first in the packaging container therein inspected for defects and after rejected or accepted depending on the outcome of the inspection.

In a preferred embodiment, where a lens-forming material is a solution, solvent-free liquid, or melt of one or more prepolymers optionally in presence of other components, reusable molds are used and the lens-forming material is cured actinically under a spatial limitation of actinic radiation to form a colored contact lens. In this case, the lens-forming material is put into a mold consisting of two mold halves, the two mold halves preferably not touching each other but having a thin gap of annular design arranged between them. The gap is connected to the mold cavity, so that excess lens material can flow away into the gap.

The two opposite surfaces (anterior surface and posterior surface) of a contact lens are defined by the two optical surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation.

Preferably from 2 to 30 colored lenses preferably from 6 to 24 and even more preferably from 8 to 14 colored lenses are manufactured in less than five minutes, preferably in less than three minutes and even more preferably in less than 2 minutes.

Any kind of ink may be used in combination with the present invention, however preferably a water based ink is used. A water based ink is an ink in which the solvent is water. The ink may also (but preferably does not) comprise an organic solvent in addition to water. The water based ink comprises at least one colorant or pigment. The choice of pigments is not critical. The pigments may be any coloring substance or combination thereof that provides a desired color.

The water based ink preferably further comprises a water-soluble binder polymer having ethylenically unsaturated groups. Preferably the binding polymer is a water-soluble, actinically crosslinkable prepolymer selected from the group consisting of: a water-soluble crosslinkable poly(vinyl alcohol) prepolymer; a water-soluble vinyl group-terminated polyurethane; derivatives of a polyvinyl alcohol, polyethyleneimine or polyvinylamine; a water-soluble crosslinkable polyurea prepolymer; crosslinkable polyacrylamide; crosslinkable statistical copolymers of vinyl lactam, methyl methacrylate and a comonomer; crosslinkable copolymers of vinyl lactam, vinyl acetate and vinyl alcohol; polyether-polyester copolymers with crosslinkable side chains; branched polyalkylene glycol-urethane prepolymers; polyalkylene glycol-tetra(meth)acrylate prepolymers; crosslinkable polyallylamine gluconolactone prepolymers, and mixtures thereof. Even more preferably the water-soluble, actinically crosslinkable prepolymer is one of the polymerizable components of the lens-forming material.

More preferably the water based ink further comprises an initiator, preferably a photoinitiator, in an amount sufficient to provide the ink a cure time being 50% or less, preferably 40% or less, more preferably 25% or less, even more preferably 15% or less, of initial cure time. Any suitable photoinitiators can be used in the ink formulations. The photoinitiator presently preferred by the inventors is Irgacure® 2959, Irgacure® 907, Irgacure® 500, Irgacure® 651, Irgacure® 369, Darocure® 1173, or Darocure® 4265.

Most preferably the water based ink further comprises a surfactant. Examples of preferred surfactants are acetylenic diol-based surfactants such as Surfynol® 420 surfactant (ethoxylated acetylenic diols). The concentration of Surfynol® 420 surfactant in an ink of the invention is preferably from 0.03% to 0.16% by weight.

In a preferred embodiment, an ink to be used in combination with the present invention comprises: water in an amount of from 30% to 98% by weight, preferably from 50% to 93% by weight; a water-soluble and actinically-curable binder polymer in an amount of from 2% to 40% by weight, preferably 6% to 30%; and at least acolorant in an amount of from 0.5% to 30% by weight, preferably 1.5% to 20%; a rapid diffusive surfactant (preferably an acetylenic diol-based surfactant, more preferably Surfynol® 420 surfactant) in an amount of from 0.03% to 0.20% by weight; and a photoinitiator in an amount of from 0.4% to 2.4% by weight, more preferably from 0.55% to 2.1% by weight, even more preferably from 0.7% to 1.5% by weight.

The water based ink has preferably a viscosity of greater than 100 centipoise (cps), more preferably above 200 cps, even more preferably above 350 cps. The viscosity of an ink solution can be as high as 5,000 cps, but is preferably between 900 to 3500 cps.

Any lens-forming materials known in the art may be used in the invention. Preferred lens-forming materials are capable of forming hydrogels. A lens-forming material may be made up of vinylic monomers like HEMA (hydroxyethylmethacrylate) or may comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention. While the selection of a lens-forming material is largely determined upon the final modality of use of the final contact lens, the presently preferred lens material is a modified polyvinyl alcohol prepolymer as disclosed in EP-A-641806, for example Nelfilcon (Ciba Vision Corp). Nelfilcon is particularly preferred because it is water soluble and finished lens of optical quality can be produced from it within a few seconds, without the necessity for subsequent extraction or finishing steps.

The "front or anterior surface" of a contact lens, as used herein, refers to the surface of the lens that faces away from the eye during wear and it is typically substantially convex. The "rear or posterior surface" of a contact lens, as used herein, refers to the surface of the lens that faces towards the eye during wear and it is typically substantially concave. While, either the front or rear surface of the contact lens or both may be printed, it is preferable to apply the ink to the front surface of the lens. However, there are special cosmetic effects achievable by providing a pattern on both the anterior and posterior surfaces. For instance, a colored pattern of one color can be applied to the back surface of the lens or the corresponding mold-half (for instance, white) and the same or different colored pattern can be applied to the front surface of the lens or the corresponding mold-half (for instance, dark blue). This then would result in a lens that could have either a multi-color textured appearance for extremely lifelike appearance, or a brighter tint using a white background to reflect back out at the observer.

If the ink is applied to both sides of a lens by printing up both sides of the mold, a pattern is affixed to both the back surface and the front surface molds as aforedescribed. Part of the lens-forming monomer mixture is supplied to each of the mold halves and each is partially polymerized thus fixing the patterns to the front and back surfaces of the lens. The two mold halves are combined, and the combination is interpolymerized to complete the cure and the formation of the lens with the patterns on both surfaces.

In addition the lens forming material may comprise small amount of a pigment to impart a uniform transparent, colored tint to the whole lens.

A contact lens can be clear before it is printed upon. Alternatively, a contact lens can be tinted prior to being printed upon. That is, a colorant may have been added to that lens using methods that are well known in the art before that lens is printed upon using the printing method of the invention.

The invention claimed is:

1. A printing station for producing a layer of coloring for a contact lens, comprising:
   a transport system to carry and transport a molding tool which comprises at least one contact lens forming mold;
   a pad unit comprising at least one pad for printing an ink image onto the contact lens forming mold;
   wherein the pad comprises a depression corresponding to the optical visual zone of a contact lens such that said depression does not contact ink during printing;
   a blade unit suitable to carry and ink a cliché with an ink;
   wherein when in use the pad transfers an inked image from the clichéto the contact lens forming mold; and
   curing means to at least partially cure the inked image after it has been transferred to the mold.

2. A printing station of claim 1 wherein the blade unit comprises an ink supply and a doctoring blade.

3. A printing station of claim 1 wherein one cliché is used for printing more than one color.

4. A printing station of claim 1 wherein the transport system alternates stationary positron and movement within the printing station.

5. A printing station of claim 4 wherein each mold is in one stationary position for no longer than 30 seconds.

6. A printing station of claim 1, wherein the ink is a water-based ink which has a viscosity greater than 100 centipoise (cps), and comprises at least one colorant, a water-soluble binder polymer having ethylenically unsaturated groups, an initiator, and a surfactant.

* * * * *